UNITED STATES PATENT OFFICE.

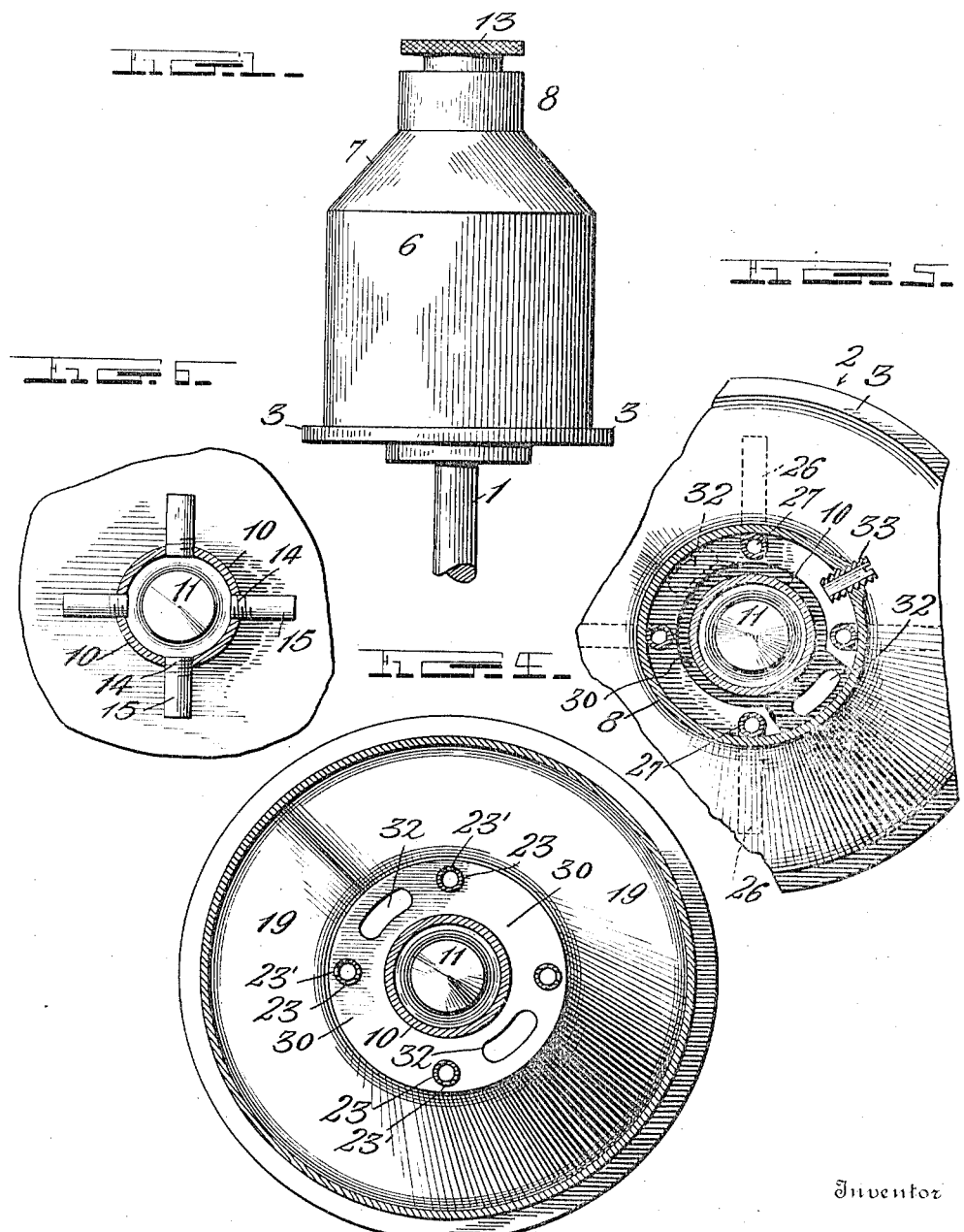

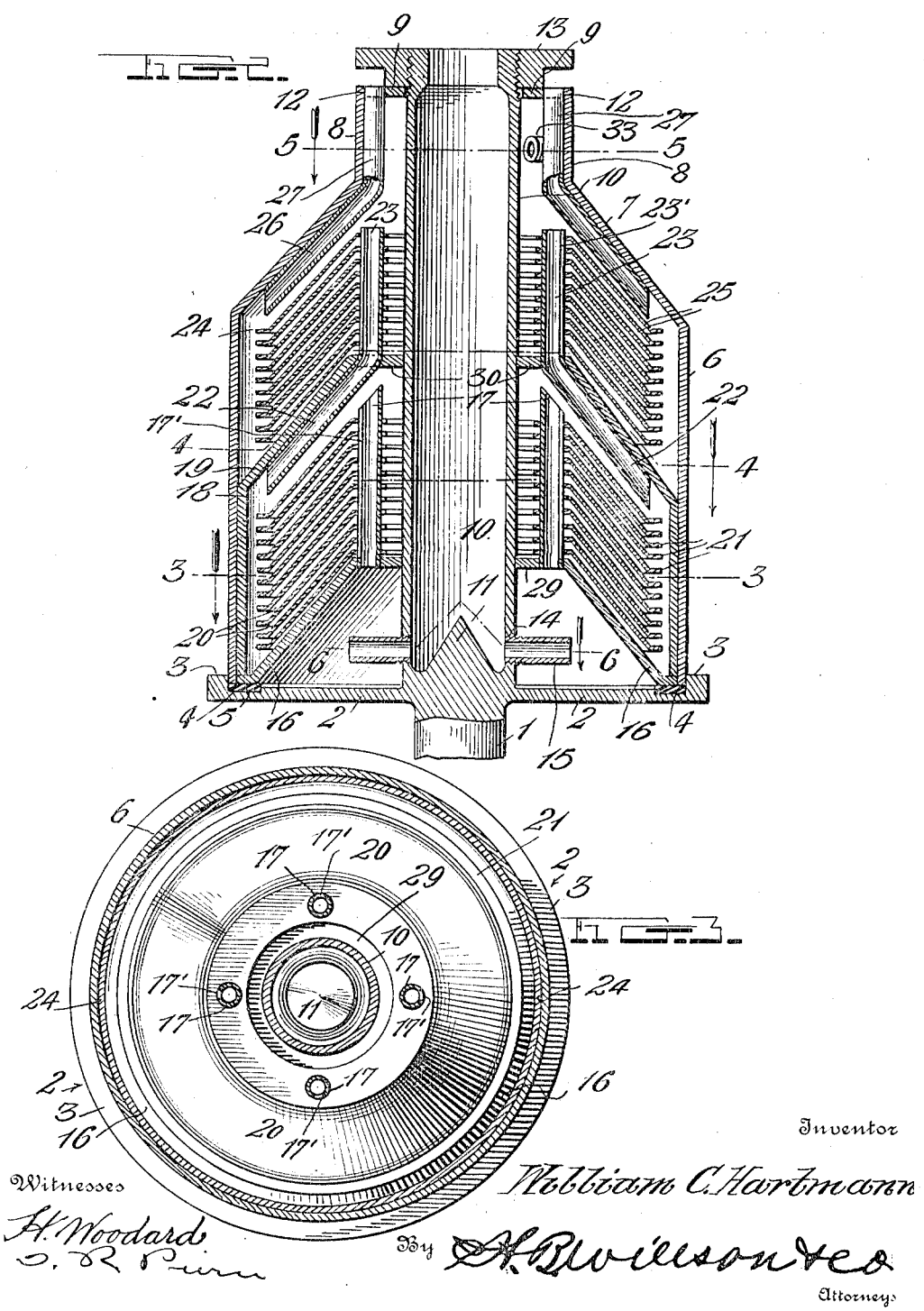

WILLIAM C. HARTMANN, OF MILWAUKEE, WISCONSIN, ASSIGNOR OF ONE-HALF TO JOHN M. FREISINGER, OF MILWAUKEE, WISCONSIN.

CREAM-SEPARATOR.

1,113,005.  Specification of Letters Patent.  Patented Oct. 6, 1914.

Application filed January 22, 1914. Serial No. 813,759.

*To all whom it may concern:*

Be it known that I, WILLIAM C. HARTMANN, a citizen of the United States, residing at Milwaukee, in the county of Milwaukee and State of Wisconsin, have invented certain new and useful Improvements in Cream-Separators; and I do declare the following to be a full, clear, and exact description of the invention, such as will enable others skilled in the art to which it appertains to make and use the same.

This invention relates to improvements in separating machines and more particularly to the inner separating bowl or liner for cream separators.

The object of the invention is to provide a simple and efficient apparatus for the compound separation of milk from cream whereby substantially all of the cream is removed from the milk in a single operation without greatly increasing the size of the apparatus.

With this and other objects in view, the invention consists of certain novel features of construction, and the combination and arrangement of parts as will be more fully described and claimed.

In the accompanying drawings—Figure 1 represents a side elevation of a cream separator constructed in accordance with this invention; Fig. 2 is a central vertical section thereof; Fig. 3 is a transverse section taken on the line 3—3 of Fig. 2; Fig. 4 is a similar view taken on the line 4—4 of Fig. 2; Fig. 5 is also a transverse section taken on the line 5—5 of Fig. 2. Fig. 6 is a detail sectional view taken on the line 6—6 of Fig. 2.

In the embodiment illustrated a driving shaft 1 is shown having a base plate 2 fixed thereon and here shown integral therewith, said plate as shown being circular and extending radially from said shaft and provided at its periphery with an upturned flange 3 having a seat 4 arranged adjacent thereto to receive a packing 5 for a purpose to be described. An inclosing casing or shell 6 is seated on the packing ring 5 the upper end of which is substantially cone shaped as shown at 7 terminating in a cylindrical neck 8 having an inturned flange 9 at its free end. A central inlet tube or hollow shaft 10 extends centrally throughout the shell or casing 6 having its lower or inner end fixed to the driving shaft 1 and if desired, it may be made integral with said driving shaft and has a cone shaped separating or dividing member 11 projecting into said inner end and preferably formed integral with the driving shaft as is shown clearly in Fig. 2.

The flange 9 at the upper end of the shell 6 is provided with a plurality of openings 12 through which the separated or skimmed milk is designed to be ejected as will be hereinafter described. The inner or free edge of this flange 9 fits snugly around the upper end of the hollow shaft or tube 10, said shaft being preferably thickened at its upper end and externally threaded to receive a clamp nut 13 which screws onto said shaft and bears against said flange 9 inside the openings 12 and is designed for clamping the shell securely on the base 2 thereby holding it in fluid tight relation to said base.

The hollow inlet shaft 10 is provided at its lower or inner end with a plurality of apertures 14 in which are mounted radially extending pipes 15 through which the full milk entering the shaft 10 is designed to pass out into a bowl 16 which surrounds the lower end of the shaft 10 and is preferably made in the form of a truncated cone shaped shell having an outturned flange at its lower large end which is adapted to be seated on the packing 5 and to be clamped in engagement therewith by another bowl to be described.

A plurality of pipes 17 are mounted in the top of the bowl 16 at points spaced from the central opening therein through which the shaft 10 passes and communicate with the interior of said bowl 16 forming passages for the milk from said bowl. These milk pipes 17 are arranged adjacent the inclined walls of the bowl 16 with their lower ends positioned to receive the milk which is thrown out against said inclined walls and passes upwardly into the pipes. The upper ends of these pipes 17 are preferably beveled downwardly and outwardly as shown clearly in Fig. 2 for a purpose to be described. A second separating bowl 18 of slightly less diameter than the shell 6 is mounted in said shell around the bowl 16, the cylindrical walls of said bowl 18 terminating at their upper ends with a truncated cone shaped top 19 which encircles the shaft 10 and fits closely against the walls thereof. The walls of this chamber 18 are preferably secured to the walls of the shell or casing 6 by screws, rivets or other suitable fastening means to adapt them to be fixed together and turn as one piece when the driving shaft 1 is operated. Secured to the pipes 17 which extend upwardly into the bowl 18 are a plurality of lining plates 20 which encircle and are fixed to said pipes 17 being spaced apart a suitable distance and which are substantially truncated cone shaped, being arranged concentric to each other and to the bowl 16, an annular space being formed between the inner edges of said plates and the shaft 10 for the passage of the lighter particles or the cream being separated. The outer edges or periphery of these plates are preferably provided with the usual laterally extending lips 21.

Secured to the inner face of the cone shaped top 19 of the bowl 18 are a plurality of pipes 22 which terminate at their inner or lower ends in alinement with the inner edges of the flanges 21 of the plates 20 and are designed to receive milk thrown out by said flanges when the machine is in operation, the milk passing upwardly through said pipes 22 and out through vertical extensions 23 thereof into a separating bowl or chamber arranged above the bowl 18. The vertical or upright portions 23 of the pipes 22 extend through the flat radial or truncated portion of the top 19 of the bowl 18 adjacent the inclined walls of said top 19 and are here shown disposed in longitudinal alinement with the pipes 17 but this arrangement is not absolutely necessary and may be varied if desired.

Another separating chamber or bowl 24 is formed by the upper portion of the casing or shell 6, the cone shaped top 7 of said casing forming the top of the chamber 24. A plurality of lining plates 25 are secured to the vertical pipe extensions 23 in this chamber 24 and are shaped similarly to the plates 20 of the chamber 18 being secured to said pipes 23 with their inner edges spaced from the shaft 10 to form a suitable cream passage or chamber.

Milk discharge pipes 26, any desired number of which may be employed, four being here shown, are secured to the inner face of the cone shaped top 7 of the casing 6 with their inner or lower ends terminating at the inner edge or base of the outturned lips of the plates 25 in position to receive the milk thrown out by said plates and through which said milk passes to vertical extensions 27 arranged in the neck 8 of the casing out to a suitable receptacle not shown positioned to receive the skimmed milk. These pipes 27 extend into the apertures 12 of the flange 9.

The radial plates or tops 29 and 30 formed by the truncated upper portion of the chambers 16 and 18 are slotted as shown at 31 and 32 in Figs. 4 and 5 respectively. The slots 31 are designed to permit the passage of the light particles or cream from the chamber 16 into the chamber 18 above, said particles closely hugging the shaft 10. The slots 32 in the top or plate 30 are designed for the same purpose, that is, to permit the passage of the cream from the chamber or bowl 18 into the chamber 24 above it.

A hollow cream outlet screw 33 extends through the neck 8 transversely of said neck and is threaded for adjustment in the opening through which it enters to adapt the inner end thereof to be discharged a greater or less distance from the shaft 10 to provide for the discharge therethrough of thick or thin cream as may be desired. When the inner end of the screw is positioned closer to the shaft 10 thick cream will be discharged therethrough and when it is arranged nearer the inner face of the neck 8, thinner cream will pass out through said screw. The pipes 17 and 23 have longitudinally extending slots 17' and 23' respectively positioned to register with the spaces between the plates 20 and 25 respectively.

In the operation of this improved separator, the full or fresh milk enters the shaft 10 through the open outer end thereof and falls to the bottom of said shaft being divided when it reaches its inner end by the cone shaped dividing element 11 projecting into the shaft which causes the milk to pass out through the tubes or pipes 15 into the bowl 16, it being understood that the drive shaft has been first set into operation thereby causing the casing 6 and all of the parts arranged therein to revolve rapidly. The revolution of the casing causes the milk entering through the pipes 15 under centrifugal force to be thrown outwardly against the upwardly inclined walls of the bowl 16 and the heavier particles of the milk pass up through the pipes 17 and the lighter particles or cream pass through the slots 31 into the chamber formed adjacent the shaft 10. The continued rotation of the separator causes the milk which enters the pipes 17 to be thrown out through the openings 17' in said pipes between the plates 20 thereby further separating the heavier from the lighter particles, the latter passing through the slots 32 in the plate 30 into the bowl or chamber 24 above. At the same time the milk between the plates 20 which is thrown out by centrifugal force against the cylindrical walls of the bowl 18 is forced upwardly through the pipes 22 and passes upwardly into the vertical portions 23 thereof and out through the openings 23' into the chamber 24 between the plates 25 disposed in said chamber whereby the heavier particles or the milk passes downwardly and outwardly against the walls of the chamber 24 while the lighter particles or cream closely hug the shaft 10 and pass upwardly between it and the pipes 23 and is discharged through the hollow screw 33 in the manner above described. The milk thrown out by the plates 25 passes upwardly into the pipes 26 and through the vertical portions 27 thereof out to a suitable receptacle positioned to receive it.

From the above description, it will be obvious that a compound separation is effected by this separator the first separation taking place in the bowl or chamber 16 and further separation in the bowls or chambers 18 and 24 arranged thereabove so that when the milk is discharged through the outlets 28, substantially all of the cream has been eliminated therefrom.

I claim as my invention:—

1. In a centrifugal cream separator, the combination of a casing, a hollow inlet tube extending from one end to the other of the casing and open at its outer end, said tube having discharge outlets at its inner end, a plurality of separating chambers arranged in said casing and disposed one above the other and each having upright pipes communicating with the chamber below, truncated cone shaped liner plates fixed to said pipes, said pipes having openings therein communicating with the spaces between the plates and cream chambers formed adjacent said inlet pipe.

2. In a centrifugal cream separator, the combination of a casing, a hollow inlet tube extending from one end to the other of the casing and open at its outer end, said tube having discharge outlets at its inner end, a plurality of separating chambers arranged in said casing and disposed one above the other and each having upright pipes communicating with the chamber below, truncated cone-shaped liner plates fixed to said pipes, said pipes having openings therein communicating with the spaces between the plates, each chamber having an upwardly inclined top wall with discharge pipes mounted on the inner face thereof and having their lower ends positioned to receive the milk thrown out by said liner plates, said pipes opening through the top walls of said chambers and communicating with the chamber above, and cream chambers formed adjacent said inlet pipe.

3. In a centrifugal cream separator, the combination of a casing, a hollow inlet tube extending from one end to the other of the casing and open at its outer end, a cone-shaped dividing element extending longitudinally into said tube at its inner end, tubes radiating from the inner end of said inlet tube and communicating with the interior thereof, a truncated cone-shaped bowl mounted in the lower end of said casing and having milk discharge pipes extending upwardly from the flat top portion of said bowl adjacent the inclined wall thereof, said flat top having openings therein adjacent the inlet tube and a plurality of vertically spaced truncated cone-shaped liner plates fixed to said discharge pipes, said casing having cream and milk outlets.

4. In a centrifugal cream separator, the combination of a casing having an upwardly and inwardly inclined top terminating in a cylindrical neck, said neck having an inturned apertured flange at the mouth thereof, an inlet tube extending from one end to the other of the casing and fitting snugly within the flange in the neck thereof, the outer end of said tube being open, a cone shaped dividing element extending longitudinally into the inner end of said tube, radial pipes opening from said tube opposite said cone shaped element, a separating bowl surrounding the inner end of said tube, and having upwardly and inwardly inclined walls with an inturned flange forming a flat top portion closely engaging said tube pipes, extending upwardly from said flat top portion adjacent the inclined walls thereof, said flat portion having openings therein between said pipes and said tube, a plurality of liner plates attached to said pipes and spaced from each other, said plates being arranged concentrically and inclining downwardly, and means for discharging the separated milk and cream from said casing.

5. In a centrifugal cream separator, the combination of a casing having an upwardly and inwardly inclined top terminating in a cylindrical neck, said neck having an inturned apertured flange at the mouth thereof, an inlet tube extending from one end to the other of the casing and fitting snugly within the flange in the neck thereof, the outer end of said tube being open, a cone shaped dividing element extending longitudinally into the inner end of said tube, radial pipes opening from said tube opposite said cone-shaped element, a separating bowl surrounding the inner end of said tube and having upwardly and inwardly inclined walls with an inturned flange forming a flat top portion closely engaging said tube, pipes extending upwardly from said flat top portion adjacent the inclined walls thereof, said flat portion having openings therein between said pipes and said tube, a plurality of liner plates attached to said pipes and spaced from each other, said plates being arranged concentrically and inclining downwardly, and a hollow cream discharge tube extending transversely of said casing and adjustable to discharge thick or thin cream, and a milk discharge opening through said casing.

In testimony whereof I have hereunto set my hand in presence of two subscribing witnesses.

WILLIAM C. HARTMANN.

Witnesses:
JOHN M. FREISINGER,
A. J. MUTH.